(12) United States Patent
Ghassabain

(10) Patent No.: US 11,907,525 B2
(45) Date of Patent: Feb. 20, 2024

(54) SCREEN STABILIZER

(71) Applicant: Benjamin Firooz Ghassabain, Marseilles (FR)

(72) Inventor: Benjamin Firooz Ghassabain, Marseilles (FR)

( * ) Notice: Subject to any disclaimer, the term of this patent is extended or adjusted under 35 U.S.C. 154(b) by 0 days.

(21) Appl. No.: 17/852,401

(22) Filed: Jun. 29, 2022

(65) Prior Publication Data
US 2022/0398009 A1 Dec. 15, 2022

Related U.S. Application Data

(63) Continuation of application No. 16/671,443, filed on Nov. 1, 2019, now Pat. No. 11,409,430.

(60) Provisional application No. 62/800,184, filed on Feb. 1, 2019, provisional application No. 62/754,644, filed on Nov. 2, 2018.

(51) Int. Cl.
*G06F 3/048* (2013.01)
*G06F 3/04883* (2022.01)
*G06F 3/04842* (2022.01)

(52) U.S. Cl.
CPC ...... *G06F 3/04883* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 9,521,221 B2* | 12/2016 | Huang | ................. | H04B 1/3888 |
| 10,901,602 B2* | 1/2021 | Shiplacoff | ............. | G06F 3/0483 |
| 10,942,632 B1* | 3/2021 | Sefton | ................. | G06F 3/04845 |
| 2008/0196945 A1* | 8/2008 | Konstas | .............. | G06F 3/03547 |
| | | | | 178/18.03 |
| 2010/0131880 A1* | 5/2010 | Lee | ..................... | H04M 1/7243 |
| | | | | 345/173 |
| 2013/0002599 A1* | 1/2013 | Townsley | .............. | G06F 3/0446 |
| | | | | 345/174 |
| 2013/0088450 A1* | 4/2013 | Takase | ................ | G06F 3/04886 |
| | | | | 345/173 |
| 2013/0120447 A1* | 5/2013 | Kim | ....................... | G06T 11/60 |
| | | | | 345/173 |
| 2013/0249843 A1* | 9/2013 | Yano | ....................... | H04M 1/67 |
| | | | | 345/173 |
| 2013/0265262 A1* | 10/2013 | Jung | ..................... | G06F 1/1652 |
| | | | | 345/173 |
| 2014/0028596 A1* | 1/2014 | Seo | ..................... | H04M 1/0268 |
| | | | | 345/173 |
| 2014/0189523 A1* | 7/2014 | Shuttleworth | ........ | G06F 3/0481 |
| | | | | 715/741 |
| 2015/0227297 A1* | 8/2015 | Kim | .................... | H04M 1/0241 |
| | | | | 715/799 |
| 2017/0245017 A1* | 8/2017 | Chaudhri | ............. | G06F 3/0481 |
| 2017/0277378 A1* | 9/2017 | Rajabi | ................... | G06F 3/0488 |
| 2017/0351364 A1* | 12/2017 | Kim | ..................... | G06F 3/0416 |
| 2019/0260864 A1* | 8/2019 | Du | ...................... | G06F 3/04883 |

* cited by examiner

*Primary Examiner* — Hua Lu

(57) ABSTRACT

A system for controlling the screen of a device comprising a device having a screen for displaying output and a virtual window displayed on an edge of said device. Said window functions independently from any other application running within said device and is always available on the screen. Providing a swiping action from said window towards inside the screen blocks said screen to some type of interaction.

11 Claims, 2 Drawing Sheets

SCREEN STABILIZER

The present patent application claims priority from:
U.S. patent application No. 62/754,644 filed on Nov. 2, 2018
U.S. patent application No. 62/800,184 filed on Feb. 1, 2019
The titles in this application may or may not be considered.

FIELD OF THE INVENTION

The invention relates to providing an easy and practical solution for protecting the touch screen of any type of device against accidental and/or undesired interaction with the touchscreen.

BACKGROUND OF THE INVENTION

The mobile devices have become the mainstream in our life. Billions of mobile devices are used by billions of people. The hardware and the software become more and more sophisticated and a huge effort is being made to provide easy and simple interface for mobile devices.

Although efforts for simplifying interface have been made in various domains, one main domain has been remained problematic and very stressful.

Touch screen of mobile devices is very, even too much, sensitive. An accidental interaction (e.g. touch) on the screen may cause a lot of stress because it may be interpreted by the system or by the corresponding application wherein its interface is displayed on the screen as a voluntary interaction and many times it causes redirection of the system/application to an undesired task such as running an undesired application or displaying a new undesired interface, etc.

In general the screen of a device is either in unlock status or in lock status. When the screen is in the unlock status, an interaction with the screen may be interpreted by the Operating System (e.g. herein may be referred to as OS) or by the main application running on the screen (e.g. the main application means the application which the user is using currently as the main application of interest (e.g. and wherein its interface and/or output generally occupies a substantial portion of the screen). (e.g. herein such main application may also be referred to as the application running on the screen)) as an event which may result to (e.g. automatically) execution of a predefined functionality. Said functionality may cause the OS or the main application to display another content on the screen. In many cases, said interaction may be accidental causing to display of an undesired content on the screen which is frustrating. On the other hand, when the screen is in lock status, an interaction with the screen is generally ignored by the OS and/or by the application running on the screen. Note that in this patent application, the interface and/or other output displayed on a layer may be referred to as a content.

In today's devices, locking and unlocking the screen is time consuming and requires frustrating interactions.

Many solutions have been proposed and/or implemented in the mobile devices to overcome this problem. Those solutions are time consuming and stressful for the user. The current invention is generally related to simplifying and accelerating the switching of the screen from unlock status to lock status and vise versa.

SUMMARY OF THE INVENTION

According to a preferred aspect, a (e.g. virtual) window (e.g. herein may be referred to as the screen control window or SCW) preferably in form of a narrow/thin line may be located on an edge of the touch screen of a device. According to a preferred embodiment, said window may preferably be related-to/controlled-by the operating system of the corresponding device. Alternatively, said window may be controlled by the main application running on the screen. Said device may be of any kind such as a smartphone, a tablet, a smartwatch, a PC, etc.

According to a preferred aspect, providing an interaction with the screen control window may be related to a screen control function (or other functions). Said interaction may preferably be providing a gesture from outside the screen towards inside the screen, by traversing the screen control window (e.g., such gesture may herein be referred to as control gesture).

According to one embodiment, if the touch screen is in an unlock status (e.g. unlock mode), a gesture provided from said window towards (e.g. anywhere or a in predefined direction) inside the screen may be related (e.g. by the operating system, controlling the said window or the touch screen) to locking said touch screen (e.g. operating system switches the screen to lock mode/status). Accordingly, if said touch screen is in lock status (e.g. lock mode), preferably, a predefined interaction such as a (e.g. principally similar) gesture provided from said window towards (e.g. anywhere) inside the screen may be related (e.g. by the operating system) to unlocking said touch screen (e.g. OS switches back the screen to unlock mode/status).

Note that, according to one aspect, preferably, said gesture is provided from a surface outside the screen (e.g. screen frame) towards inside the screen and wherein when said gesture enters inside the screen, said gesture at first interacts with said screen control window.

Preferably, locking the screen means that any type of interaction other than a (e.g. one or more) predefined type of interaction (e.g. such as said gesture as described above) with the touch screen may not be considered (e.g. is preferably ignored) by the operating system controlling the touch screen (e.g. the screen becomes irresponsive to any interaction other than said a predefined type of interaction). Optionally, locking the screen may preferably mean that any interaction with the touch screen, preferably other than said a type of interaction (e.g. a gesture as described above) may not be considered by the operating system of the device (e.g. the operating system of the device becomes irresponsive to any interaction preferably other than said a predefined type of interaction).

Note that, in this patent application, the output/interface of the main application running on the screen may be considered/described as being displayed on a first (e.g. virtual) layer on the screen.

Layers

According to one aspect, providing a gesture from said screen control window as described, may bring up a new (e.g. virtual) layer above said first layer so that interaction with the interface/output of the main application running on the screen becomes impossible because said interaction is provided on said new layer.

According to one aspect, a predefined interaction (e.g. a gesture, a tap, a double-tap, etc.) with said new layer may be used to remove said new layer from the screen and preferably permit the access to the content displayed on the first layer.

According to one aspect, instead of said narrow window, a surface of the device, for example, the surface around the screen (e.g. the frame of the screen) may be touch sensitive wherein a gesture provided from (e.g. anywhere on) said surface towards (e.g. anywhere) inside the screen may be related to locking the screen. Preferably a next gesture provided from said touch surface towards anywhere inside the screen may unlock the screen (e.g. and so on). Optimally (e.g. if the said gesture bring up a new layer as described before), a predefined interaction (e.g. a gesture, a tap, a double-tap, etc.) with said new layer may be used to remove said new layer from the screen and preferably permit the access to the content displayed on the first layer.

Other aspects for the same purpose using the principles herein may be considered by people skilled in the art.

DETAILED DESCRIPTION OF THE INVENTION

Figure 1A:
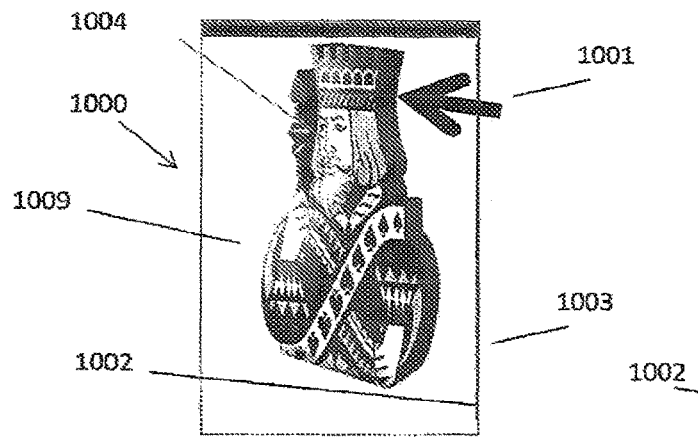
FIG. 1A shows an unlocked screen (e.g. herein maybe referred to as unstable screen) wherein a first gesture is being provided from an edge of the screen for locking the screen.

As mentioned before, the screen of devices such as mobile phones are generally touch sensitive (e.g. a touch sensitive screen may herein be referred to as a touch screen). Modern touch screens are very sensitive to touch to provide high quality response to user's interactions. On the other hand such touch screens are prone to erroneous response due to accidental/undesired touches provided with the screen. To solve this problem different solutions are provided herein.

According to preferred aspect, the screen control window as described above may be controlled by/related to another application preferably regardless of any main application running on the screen. (e.g., said another application may herein be referred to as a "secondary application"). Alternatively, said screen control window may be controlled by/elated to any other software and/or hardware such as, by the operating system of the corresponding device, by a software or hardware controlling the touch screen of the corresponding device, etc.

Preferably said screen control window is a narrow window located on an edge of the (touch) screen. Preferably said narrow window is in the form of a narrow line.

Preferably the width of said narrow window is at most a few pixels. Preferably the width of said narrow window is less than 20 pixels or less than 10 pixels or less than five pixels or even 1 to two pixels.

Preferably the length of said narrow window is substantially the size of the corresponding edge of the screen. Optionally, at least two narrow windows are located on an edge of the screen.

Preferably said screen control window is invisible or barely visible.

Preferably, said screen control window functions independently from the interface of any main/other application displayed (e.g. at any time) on the screen. As an example, if a first main application running on the screen displays an interface on the screen, said screen control window independently from said first main application is also displayed on the screen and functions independently of (e.g. the interface of) said first main application. Preferably, if thereafter, a second main application runs on the screen (e.g. and displays a second interface on the screen), said screen control window preferably remains on the screen and preferably still functions independently from said second main application running on the screen. And so on.

Preferably said screen control window is permanently displayed on the screen. Optionally said screen control window is displayed on the screen for a (e.g. predefined) laps of time based on one or more (e.g. predefined) conditions/principles.

According to one embodiment, a (e.g. first) gesture provided from (e.g. preferably anywhere on/of) said screen control window may lock the screen. As an example, a gesture provided from a narrow screen control window towards inside the screen may lock the screen (e.g. switches the screen from unlocked status to locked status). Said gesture is preferably provided from outside the screen towards (e.g. anywhere) inside the screen. Preferably, said screen control window is located on an edge of the screen such that when a gesture provided from a surface outside the screen (e.g. screen frame) towards inside the screen enters inside the screen, said gesture at first interacts with said screen control window so that the (e.g. the application/software related to the) screen control window captures the corresponding event before any other application running on the screen.

Preferably, said gesture may end anywhere inside the screen. Optionally, said gesture ends in a predefined location inside the screen. Optionally, said gesture traverses the screen (e.g. and ends outside the screen).

Preferably, a predefined interaction such as a (e.g. similar) second/next gesture provided from said screen control window towards inside the screen may unlock said screen. As an example, a next gesture provided from a/said (narrow) screen control window towards inside the screen may unlock the screen (e.g. switches the screen from lock status to unlock status). Said gesture is preferably provided from outside the screen towards (e.g. anywhere) inside the screen as described above.

As an example, FIG. 1A shows the touch screen 1009 of a device 1000 being in unlock position. An interface of an application running in the device is displayed on said screen. A narrow screen control window (e.g. as escribed) 1002 is located on an edge of the screen 1009. In this example, the screen in in unlock mode and an interface 1004 of an application is displayed on the screen 1009. In order to lock said screen 1009, a user may provide a gesture 1001 departing from (e.g. outside of the screen 1003 and first interacting with) the screen control window 1002 towards (e.g. preferably anywhere) inside the screen.

Figure 1B:
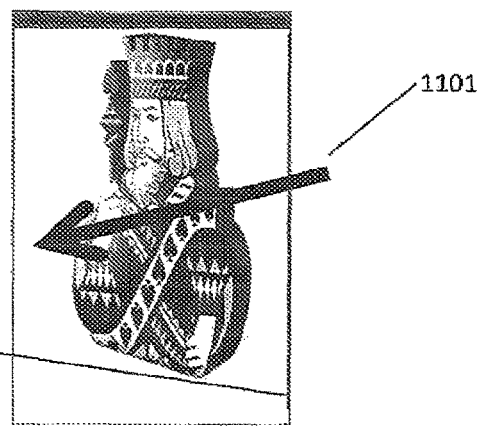
FIG. 1B shows the locked screen (e.g. herein may be referred to as stable screen) of FIG. 1 which is being unlocked by providing a second gesture from an (e.g. said) edge of the screen towards inside the screen.
Figure 1C:
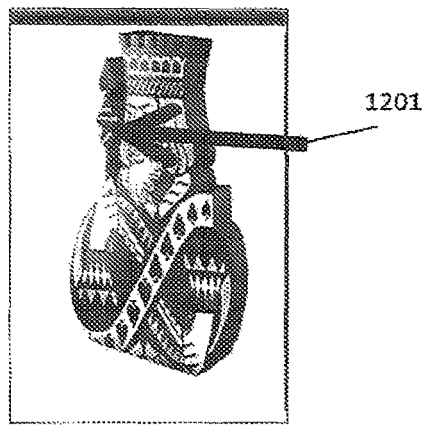
FIG. 1C shows the unlocked screen wherein a third gesture is being provided from an (e.g. said) edge of the screen for locking the screen again.

FIG. 2 shows the device 1000 of FIG. 1 wherein the screen is being locked (e.g. after the screen being locked by the gesture of FIG. 1). As shown in FIG. 2, a new/next gesture 1101 provided from the screen control window towards (e.g. anywhere) inside the screen unlocks the screen (e.g. switches back the screen into the unlocked mode).

Figure 3A:
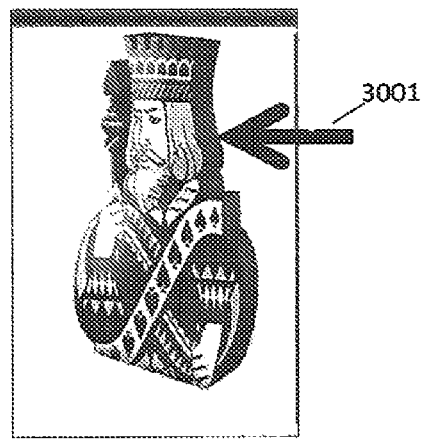
FIG. 3A shows the screen orientation being fixed in portrait mode, according to one embodiment of the invention.
Figure 3B:
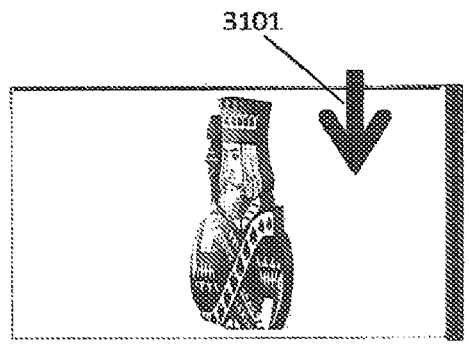
FIG. 3B shows the screen orientation being fixed in landscape mode, according to one embodiment of the invention.

In FIG. 3, the screen is again locked by providing a next gesture 1201 in a similar manner. And so on.

According to another embodiment, said screen control window may not be part of the screen. Said screen control window may be in form of a hardware (e.g. narrow) touch sensitive surface, preferably in a shape similar to the virtual window described above, located outside of the touch screen (e.g. on the surface of the frame of the screen corresponding to an edge of the screen).

Note that, this aspect requires dedicated hardware and software which may complicate the manufacturing and/or may augment the cost of the manufacturing.

According to one embodiment, providing gestures from different zones on of the screen control window towards inside the screen may be related to different functions. For example, providing a gesture from a first portion of the screen control window towards inside the screen may be related to locking/unlocking the screen and providing a gesture from a second portion of the screen control window towards inside the screen may be related to blocking/unblocking the screen rotation.

Gesture/Tap Authorized

According to one embodiment, when the screen is locked based on principles described herein, some predefined types of interactions with the screen may be authorized/responded by the (e.g. screen control) operating system. As an example, gestures (e.g. for content scrolling functions on the screen) may be authorized (e.g. only). Also as another example, taps may be authorized (e.g. only). Etc.

Screen does not go to Sleep Mode

According to one embodiment, when the screen is locked based on principles described herein, the screen does not enter into sleep mode.

Note that the screen control window may be used for any other functions such as other screen control functions or functions not relates to the screen control.

Invisible Layer
Screenshot
Layer Covers the Whole Screen
A Gesture Towards Out Removes the Layer
Independently—is Controlled by OS
Applications can Change but the Layer Remains (e.g. Unchanged) on the Screen According to one embodiment, a gesture provided (e.g. in a predefined direction) from (e.g. the outside the screen and at first touching) a screen control window positioned on the edge of the screen towards inside the screen (e.g. as described before) may bring up a new layer above the first layer on which the content of the main application is displayed on the screen. Preferably said new layer is transparent to permit the user to view said content which is displayed on the first layer. Optimally said new layer is not transparent or is barely transparent.

Preferably, said new layer is interactable (e.g. has an interactable interface). Optionally said new layer is not interactable.

Preferably, said new layer covers at least a large portion of the screen (e.g. excluding one or more interface such as the screen control window, the notifications bar of the device, etc.). Optionally, said new layer covers (e.g. substantially) the whole screen.

Preferably, said new layer (e.g. and its interface) is brought up and/or functions independently from the main application which is displayed on the first layer on the screen (e.g. the screen control window and the corresponding layer are controlled by the Operating System of the corresponding device). As an example, the main application running on the screen which displays a corresponding content on the first layer may change/be replaced by a new main application but said new layer preferably remains (e.g. unchanged/as is) on the screen.

According to one embodiment, said gesture brings up said new layer which preferably is invisible and preferably covers a substantial portion of the (e.g. preferably the whole) screen. By providing such a new layer above said first layer, the content displayed on said first layer will become inaccessible to user's interaction (e.g. touching actions) and therefore touching (e.g. accidently or by purpose) the screen preferably is not related to the content displayed on the first layer. Therefore, said new layer may be used as a shield to protect the content displayed on the first layer from being interacted.

By using this method, the user may bring up quickly a transparent layer above any content which is displayed on the screen and any (e.g. physical) interaction with the screen may be first captured by said new transparent layer and the content displayed under said new layer on the screen may become stable regardless of any interaction with the screen.

As an example, when a user is using the Wayz (e.g. GPS) application on a smartphone, by bringing said new transparent layer on the output of Wayz displayed on the screen, any accidental interaction with the screen does not affect the functionality of the Wayz application, eliminating the frustration of accidental interaction with the screen of the device specially when driving.

Figure 2A:
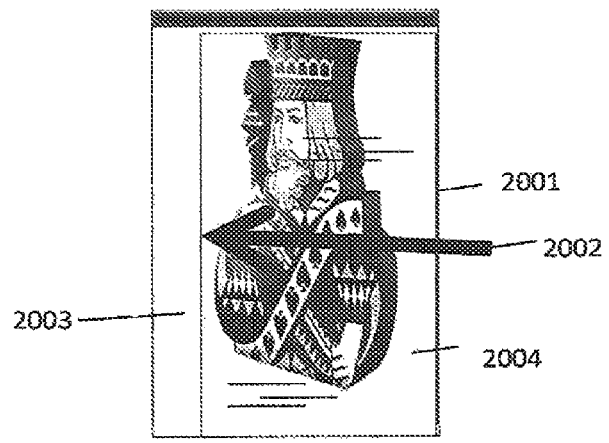
FIG. 2A shows the screen being locked partially, according to one embodiment of the invention.

According to one aspect, the new layer is brought up after said gesture is provided. According to another aspect the new layer is brought up after said during providing the gesture. FIG. 2A, shows a new layer 2004 is being (gradually) brought up above the first layer 2003 while providing the control gesture 2002 provided from outside the screen towards inside the screen by traversing the screen control window 2001. Preferably, the size of the new letter is predefined. Optionally, the size of the new layer is related to the size of gesture on the screen.

According to one embodiment, said new layer is (e.g. mainly) designed/created to protect the content displayed on the first layer (e.g. from accidental (e.g. physical) interactions) with the screen.

Optionally, interacting with said new layer may (e.g. also) be related to some functionalities. As an example, a predefined interaction (e.g. a gesture (e.g. in a predefined direction or a gesture starting on said layer and touching an edge of said screen), a tap, a double-tap, etc.) provided (e.g. preferably, anywhere) on said on said new layer may be used to remove said new layer from the screen and preferably permit the access to the content displayed on the first layer (e.g. permits to interact with the output/interface of the main application running on the screen).

With continuous description of the current embodiment, optionally said new layer includes an (e.g. invisible) interface to permit providing input on it. As an example, while a user is viewing the content displayed on the first layer, he/she may type/write text, draw shapes, insert media, etc., on the interface available on said new (e.g. herein may also be referred to as a second) layer. Thereafter, the user may for example take an screenshot of the device (e.g. including the contents displayed on the first and the second layers) and preferably save or share it with others.

MyApp Application

According to one embodiment, an application may be produced wherein a gesture provided from (e.g. the outside the screen, at first touching) a (e.g. narrow) window positioned on the edge of the screen (e.g. in a predefined direction) towards the screen (e.g. as described before) may bring up (e.g. a new layer including) an interface for entering text and/or other media within/on it. Upon such interaction preferably a number of input means (e.g. an on-screen keyboard, a handwriting recognition system, a voice recognition system, etc.) may (automatically or manually) also become available to the user. At this time the user may enter/include a text, an image or any other media on the interface (e.g. of said new layer) which is brought up by said gesture on the screen (e.g. said interface and said input together may be herein referred to as combined media). The user may then save and/or share said combined media. By doing so, a user may at any moment instantly take notes or enter other media and save and/or share it/them with others. Said interface may be used as a text field and/or a virtual board to support/include the information being entered by the user in/on it.

Note that the said combined media may form a single image/content or they may be on different layers and therefore be saved and/or shared, respectively, together or separately.

Ignoring Interactions with the Hard Buttons of the Device

According to a preferred embodiment, when the screen is locked, any type of interaction other one or more specific interactions may be ignored by the operating system or by said secondary application which controls the screen. As an example, in addition to ignoring interactions with the screen, the system also may ignore interactions with the hard buttons of the corresponding device.

Sleep, Orientation, Etc.

Figure 2B:
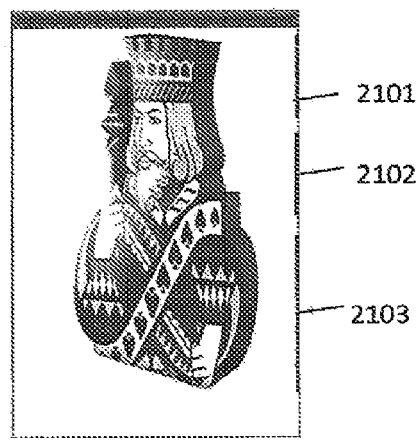
FIG. 2B shows the screen being locked entirely, according to one embodiment of the invention.

According to one aspect of the invention, an (any of one or more) edge/s of the screen may have more than one screen control window, each corresponding to one or more (e.g. predefined) function/s or combination of said functions. For example, a (e.g. first) SCW may be related to protecting the screen from (unintentional) interaction, (e.g. second) SCW may be related to fixing the screen in its current orientation, (e.g. third) SCW may be related to preventing to enter or to enter the screen in auto-sleep mode, etc., or combination of said functions. FIG. 2B, shows screen controls windows 2101 to 2103. In the exemplary FIGS. 3A and 3B, the screen orientation is respectfully being fixed in portrait and landscape modes by providing the gestures 3001 and 3101.

Any Shape

Not Only to Screen Functions

The screen control window may have any shape such as foe example a square or oval button, etc.

In general, each of one or more screen control windows may be related to a different function. Although in this application, the scrren described is called "screen control window", the functions may be of any kind, related or not related to screen controls.

Gesture Upon Removing the Finger from the Screen During by Dragging

Note that, according to one aspect, the function relating to the control gesture is executed after user's finger providing the control gesture crosses the SCW. According to a second aspect, the function relating to the control gesture is executed when the user providing the control gesture removes his finger from the screen (e.g. finishes the gesture). Other aspects may be considered by people skilled in the art.

According to one aspect, the shape of the gesture defines a function. As an example, a predefined complex gesture may be related to blocking (and/or unblocking) the screen as described. This may be used as a password to block/unblock the screen.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

It is to be understood that the drawings are not necessarily drawn to scale, but that they are merely conceptual in nature.

Dependently—Relates to Main Application Running on the Screen

It must also be noted, that any of the principles, systems, features, means, methods, etc., described in any part (e.g. embodiments) of this patent application may be used separately or being combined with principles, systems, features, means, methods, etc., of other different parts (e.g. embodiments) of the invention. As an example, the screen control window may be part of the interface of a main application and being controlled (e.g. by providing a gesture as described) by said main application which is running on the screen to protect the content of said main application from some types of (e.g. accidental) interactions (e.g. during a laps of time).

Note that, in any part (e.g. embodiment) of this patent application, any of the above-mentioned means of screen controlling systems may be used to replace the screen controlling system described in said part (e.g. embodiment).

The invention claimed is:

1. A system for controlling a screen of a device comprising:
    a device having a touch sensitive screen for displaying output; and
    a virtual window displayed on an edge of the screen of said device, wherein said window is related to a first application that functions independently from a second application running within said device, and
    wherein an interface of said second application, substantially occupying an entire surface of said screen, is displayed on the screen simultaneously with said window;
    wherein upon providing a swiping action, by a user, from said window towards inside the screen, at least a portion of the screen on which said interface of the second application is displayed becomes irresponsive to all types of interactions with said screen to which said screen is responsive except to a predefined type of interaction with said screen that is adapted to turn said at least a portion of the screen back to be responsive to said all types of interactions with said screen to which said screen is responsive.

2. The system of claim 1, wherein said at least a portion of the screen occupies up to an entire surface of the screen.

3. The system of claim 1, wherein said window is in form of a line positioned on and along an edge of the screen and wherein said swiping action is provided from outside the screen towards inside the screen and wherein said swiping action at first interacts with said window when entering inside the screen.

4. The system of claim 3, wherein said line has a width of less than 20 pixels.

5. The system of claim 1, wherein said predefined interaction is a double-tap provided on said at least a portion of the screen.

6. The system of claim 1, wherein said first application is a software related to an operating system of the device.

7. The system of claim 1, wherein said second application is each of a plurality of applications running within said device at a different instance, and wherein said interface of the second application replaces an interface of another application of said plurality of applications on the screen.

8. The system of claim 1, wherein said screen does not enter into sleep mode while said at least a portion of the screen is irresponsive to said user's interactions.

9. The system of claim 1, wherein said window is controlled by an operating system of the device.

10. The system of claim 1, wherein said predefined interaction is providing a gesture from inside the screen towards outside the screen.

11. The system of claim 1, wherein said device is one of, a PC, a smartphone, a tablet and a smartwatch.

\* \* \* \* \*